Patented Apr. 13, 1948

2,439,720

UNITED STATES PATENT OFFICE 2,439,720

PROCESS OF PRODUCING SODIUM TETRATHIONATE

Raymond W. Crosley, Hazel Crest, and Albert L. Raymond, Northfield, Ill., assignors to G. D. Searle & Co., Skokie, Ill., a corporation of Illinois No Drawing. Application August 7, 1942, Serial No. 454,074

3 Claims. (Cl. 23—115)

This invention relates to a process for the purification of sodium tetrathionate and to a new physical form of sodium tetrathionate which is the product of that process. This new physical form is characterized by having a relatively low density, a relatively high stability and by having less water of crystallization than the commonly known form of sodium tetrathionate.

Sodium tetrathionate is of value therapeutically, and when thus used it is ordinarily administered intravenously as an aqueous solution of the salt. Solutions of the salt are not stable for long periods of time, however, so that sodium tetrathionate is ordinarily offered for therapeutic use as a dry powder, sealed in sterile ampules, which powder can be readily dissolved in an appropriate amount of water just before use. This dry salt appears to be stable almost without limit when prepared in a very pure state, whereas very small amounts of certain impurities are known seriously to impair the stability of the dry salt. It is an object of this invention to prepare such a purified, stable form of sodium tetrathionate.

Sodium tetrathionate dihydrate

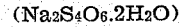
$(Na_2S_4O_6.2H_2O)$ which is the ordinary crystalline form of this salt, is commonly prepared by the interaction of sodium thiosulfate and iodine in concentrated aqueous solution, the tetrathionate being precipitated from the reaction mixture by the addition of alcohol. Inasmuch as sodium iodide (which is formed as a by-product during the reaction) is among the impurities known to interfere with the stability of dry sodium tetrathionate, it is obvious that the salt as first obtained must be further purified. It has been found impossible to obtain satisfactory purification by simple washing with ordinary 95 per cent ethyl alcohol, even though sodium iodide is very soluble in this solvent, probably because the crystals of sodium tetrathionate as obtained are quite dense and frequently relatively large in size, making it impossible for the alcohol to leach out the impurity occluded within the crystals. According to the teaching of the prior art, this purification of the salt is best carried out by dissolving the crystals in water and recrystallizing upon the addition of alcohol. Such a purification results in a large loss of yield, particularly if it must be repeated a second time.

As a part of the present invention, it has been found that if the crude dihydrate crystals as isolated from the reaction mixture are first washed several times with 95 per cent ethyl alcohol, which may conveniently be done on a Büchner funnel, to remove mechanically adhering aqueous liquid, then freed from excess solvent by brief suction, and then treated in a flask with a relatively large volume of substantially anhydrous ethyl alcohol, the relatively dense dihydrate crystals gradually lose their form and swell to many times their former bulk, frequently stiffening the whole mixture to a non-pouring paste. The powder obtained by filtering and drying such a mixture is light and fluffy, has a much smaller particle size, and is substantially less hydrated than the original dihydrate crystals. Further, the powder thus obtained is found to be substantially free of sodium iodide; and any last traces thereof may be further removed by continued washing with alcohol. This improved efficiency of washing is probably due to the extreme comminution of the material in consequence of the change in crystal structure, but the utility or efficiency of this invention is by no means limited by the accuracy of this explanation.

It has been found, further, that the above phenomena can be reproduced, within limits, by other anhydrous solvents in which water is readily soluble. For instance, when dry acetone is substituted for the anhydrous ethyl alcohol above, the swelling appears to be slower, though similar in nature, the final product being a finely divided powder of low density and substantially free of undesired impurities.

When anhydrous methanol is used in place of anhydrous ethyl alcohol, it is found that the sodium tetrathionate dissolves completely in a comparatively small volume of the solvent, but that it can be reprecipitated by the addition of an appropriate volume of dry acetone to the methanol solution. The material thus precipitated is also in the form of a finely divided powder, substantially free from undesired impurities.

As a further example of the use of anhydrous solvents in which water is readily soluble, anhydrous isopropanol has been observed to react similarly to anhydrous ethanol, though distinctly at a slower rate.

The products obtained by treatment with these various anhydrous solvents differ among themselves somewhat in their content of solvent of crystallization. All contain substantially less water of crystallization than the dihydrate, the actual amount ordinarily varying between none at all and that amount which approximately corresponds with one molecule of water of crystallization. In addition to such small amounts of water of crystallization, there are present varying amounts of solvent of crystallization (methanol, ethanol, acetone, etc., depending upon which solvent was used), amounts which may range up to one molecule of such solvent. The exact amounts and proportions of water and solvent of crystallization depend somewhat on the length of time allowed for the swelling process, the proportion of solvent used, whether or not the process is repeated, and upon other similar factors which will be apparent to a skilled chemist.

The following is a detailed example of how the present invention may be practiced, using anhydrous ethanol as the solvent:

A quantity of sodium tetrathionate dihydrate is prepared in any convenient fashion, such as by the interaction of 410 grams of sodium thiosulfate dissolved in 180 cubic centimeters of water with 200 grams of iodine suspended in 30 cubic centimeters of water and 100 grams of ice, taking care that there is at all times an excess of iodine throughout the reaction mixture, and then precipitating the crystalline dihydrate salt by two liters of alcohol. After cooling and settling, the crystals are filtered and sucked reasonably dry. They are then washed with several successive portions of 95 per cent ethanol and finally with several portions of absolute alcohol, and they are then sucked quite dry on the filter. The crystals are then transferred to a dry flask and allowed to stand under 500 cubic centimeters of anhydrous ethanol with occasional shaking or stirring. In a short while the crystals are observed to settle more slowly and finally to begin to set to a paste. At this point another 500 cc. portion of absolute ethanol is added to produce a thin slurry, this treatment being repeated later in the process if necessary. After standing overnight, the finely powdered product is filtered, washed further with anhydrous ethanol on the funnel, if desired, and then dried in a vacuum desiccator. After grinding the granulations formed in drying, the thoroughly dried powder is ready to be filled into ampules, or to be used for any other purpose desired. This powder is instantly soluble in water.

When thus prepared, samples of sodium tetrathionate have been found to be stable in sealed ampules for periods of several years. Because of this great stability, sodium tetrathionate may be prepared in large batches and purified according to this invention and distributed through the ordinary marketing channels for use by the medical profession in making solutions for parenteral injections, without regard to the date of manufacture. However, the practice of this invention is by no means limited to the purification of sodium tetrathionate for use in preparing solutions for injection, but this invention may be used to purify sodium tetrathionate for any use, therapeutic or otherwise, for which a pure, stable, readily soluble form of sodium tetrathionate may be desired, or for which a form less hydrated than the commonly known dihydrate may be needed.

We claim:

1. The process of preparing stable sodium tetrathionate powder characterized by a high degree of purity and by substantially less water of crystallization than the commonly known sodium tetrathionate dihydrate crystals, which comprises treating sodium tetrathionate dihydrate crystals with a liquid consisting of an anhydrous organic solvent in which water is readily soluble.

2. The process of preparing stable sodium tetrathionate powder characterized by a high degree of purity and by substantially less water of crystallization than the commonly known sodium tetrathionate dihydrate crystals, which comprises treating sodium tetrathionate dihydrate crystals with a liquid consisting of anhydrous ethyl alcohol.

3. The process of purifying sodium tetrathionate, which comprises treating sodium tetrathionate dihydrate crystals with a liquid consisting of anhydrous ethyl alcohol until the swelling of the crystals is substantially complete.

RAYMOND W. CROSLEY.
ALBERT L. RAYMOND.

REFERENCES CITED

The following references are of record in the file of this patent:

UNITED STATES PATENTS

| Number | Name | Date |
| --- | --- | --- |
| 1,813,272 | Biltz | July 7, 1931 |

OTHER REFERENCES

Gmelin-Kraut: "Handbuch der Anorganischen Chemie," Band II, Abteilung I, page 341. Published by Carl Winters Universitatsbuch-handlung, Heidelberg, (1906).

Mellor: "Inorganic and Theoretical Chemistry," vol. 10, page 617. Published by Longmans, Green, and Co., London (1930).